United States Patent
Park

(10) Patent No.: US 9,380,433 B2
(45) Date of Patent: Jun. 28, 2016

(54) MOBILE TERMINAL AND CONTROL METHOD THEREOF

(71) Applicant: LG ELECTRONICS INC., Seoul (KR)

(72) Inventor: Heela Park, Anyang (KR)

(73) Assignee: LG Electronics Inc., Seoul (KR)

( * ) Notice: Subject to any disclaimer, the term of this patent is extended or adjusted under 35 U.S.C. 154(b) by 59 days.

(21) Appl. No.: 13/757,354

(22) Filed: Feb. 1, 2013

(65) Prior Publication Data

US 2013/0316695 A1   Nov. 28, 2013

(30) Foreign Application Priority Data

May 22, 2012   (KR) .................. 10-2012-0054402

(51) Int. Cl.
| | |
|---|---|
| *H04W 4/12* | (2009.01) |
| *G06Q 10/10* | (2012.01) |
| *G06F 3/0488* | (2013.01) |
| *H04M 1/725* | (2006.01) |
| *H04L 12/58* | (2006.01) |
| *G06F 3/0481* | (2013.01) |

(52) U.S. Cl.
CPC .............. *H04W 4/12* (2013.01); *G06F 3/0488* (2013.01); *G06F 3/04817* (2013.01); *G06Q 10/10* (2013.01); *H04L 51/32* (2013.01); *H04M 1/72552* (2013.01); *H04M 1/72583* (2013.01); *H04L 51/38* (2013.01); *H04M 2250/12* (2013.01)

(58) Field of Classification Search
CPC ..................... G09G 1/007; G09G 5/14; G06F 2203/04803; H04N 7/147; H04N 7/141; H04N 21/4788; H04N 21/4223; H04N 21/47; H04N 5/23222
See application file for complete search history.

(56) References Cited

U.S. PATENT DOCUMENTS

| | | | |
|---|---|---|---|
| 2006/0025220 A1* | 2/2006 | Macauley et al. ............... | 463/42 |
| 2007/0033534 A1 | 2/2007 | Kim et al. | |
| 2010/0248788 A1* | 9/2010 | Yook et al. .................... | 455/566 |
| 2011/0009103 A1 | 1/2011 | Do | |
| 2011/0128410 A1* | 6/2011 | Lee et al. ................. | 348/231.99 |
| 2011/0183651 A1* | 7/2011 | Mundy et al. .............. | 455/414.1 |
| 2011/0202626 A1* | 8/2011 | Caplan et al. ................. | 709/217 |
| 2011/0282697 A1* | 11/2011 | Fitzgerald et al. ............... | 705/4 |
| 2013/0093833 A1* | 4/2013 | Al-Asaaed et al. ........ | 348/14.02 |
| 2013/0321340 A1* | 12/2013 | Seo et al. ...................... | 345/174 |

FOREIGN PATENT DOCUMENTS

| | | |
|---|---|---|
| WO | WO 2004/017596 A1 | 2/2004 |
| WO | WO 2004017596 A1 * | 2/2004 |

OTHER PUBLICATIONS

Skype website http://community.skype.com/t5/media/gallerypage/image-id/7778iAE42B500D12DBF4F, dated Jun. 12, 2011.*
Rovers et al., "HIM: A Framework for Haptic Instant Messaging," Late Breaking Results Paper, Apr. 24-29, 2004, pp. 1313-1316.

* cited by examiner

*Primary Examiner* — George Eng
*Assistant Examiner* — Umair Ahsan
(74) *Attorney, Agent, or Firm* — Birch, Stewart, Kolasch & Birch, LLP

(57) ABSTRACT

Disclosed is a mobile terminal for receiving a message and a control method thereof. The mobile terminal includes: a wireless communication unit for receiving a message; a display unit for displaying a received message; and a controller for detecting a sensor related to an emoticon when the emoticon is included in the message displayed on the display unit, and controlling the detected sensor to perform a function corresponding to the emoticon.

8 Claims, 7 Drawing Sheets

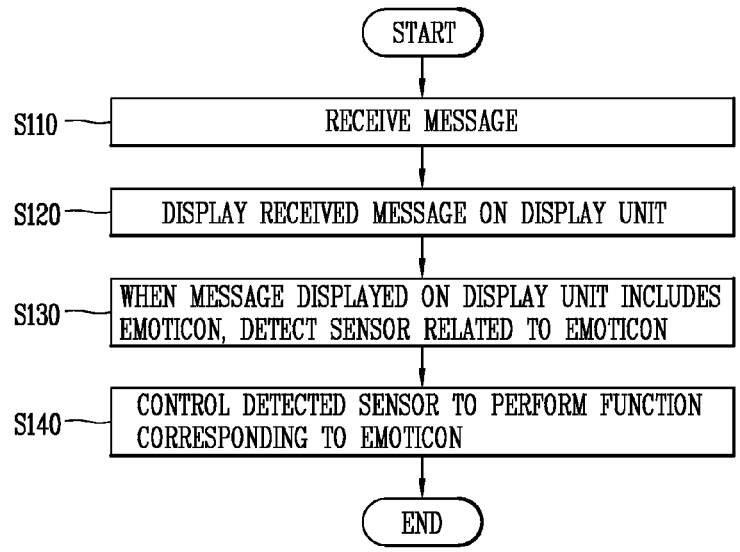
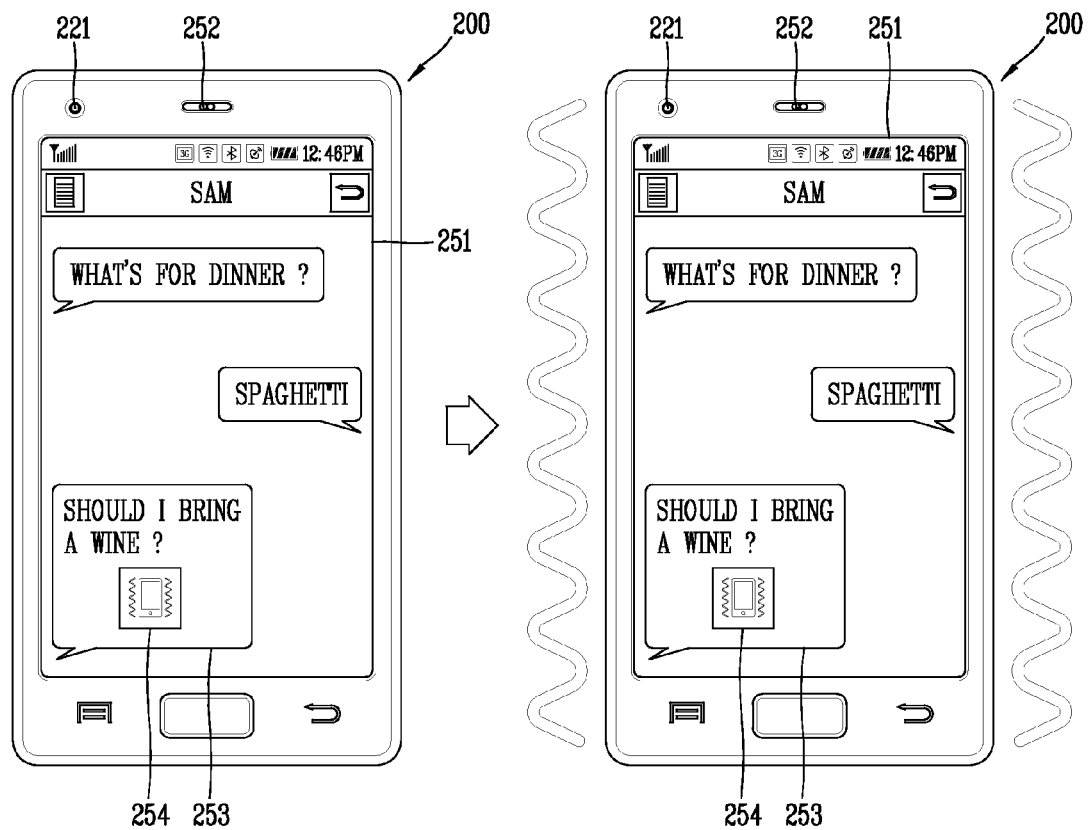

Pursuant to 35 U.S.C. §119(a), this application claims the benefit of earlier filing date and right of priority to Korean Application No. 10-2012-0054402, filed on May 22, 2012, the contents of which is incorporated by reference herein in its entirety.

BACKGROUND OF THE INVENTION

1. Field of the Invention

The present disclosure relates to a mobile terminal, and more particularly, to a mobile terminal capable of receiving a message and a control method thereof.

2. Background of the Invention

Terminals may be divided into mobile/portable terminals and stationary terminals according to whether or not the terminals are movable. In addition, the mobile/portable terminals may be divided into handheld terminals and vehicle mount terminals according to whether or not the terminals can be directly carried by users.

As the functionality of such terminals is diversified, the terminals have been implemented in the form of a multimedia player having complex functions including, for example, photographing or video capturing functions, music or video file playback functions, game play functions, broadcast reception functions, etc. To support and increase the functionality of such terminals, consideration to improve hardware parts and/or software parts of the terminal may be made.

Based on the improvement, terminals may transmit and receive messages by using a messenger, a short message service (SMS), a multimedia messaging service (MMS), a social network service (SNS), and the like, According to the message transmission and reception function, terminals may perform one-to-one, one-to-many, and many-to-many communication, and may transmit and receive messages having a splendid multimedia effect dubbed emoticon. However, an emoticon is merely displayed in the form of combinations of special characters, an image, or a flash on a display unit and cannot control a special function of a terminal.

SUMMARY OF THE INVENTION

Therefore, an aspect of the detailed description is to provide a mobile terminal capable of improving user convenience by using a received emoticon and a control method thereof.

To achieve these and other advantages and in accordance with the purpose of this specification, as embodied and broadly described herein, a mobile terminal includes: a wireless communication unit for receiving a message; a display unit for displaying a received message; and a controller for detecting a sensor related to an emoticon when the emoticon is included in the message displayed on the display unit, and controlling the detected sensor to perform a function corresponding to the emoticon.

In an embodiment, when a first touch input with respect to the emoticon displayed on the display unit is sensed, the controller may control an operation of the detected sensor.

In an embodiment, when a second touch input with respect to the emoticon displayed on the display unit is sensed, a setting of the detected sensor may be changed.

In an embodiment, the sensor may include at least one of a camera sensor, an illumination control sensor, a call signal transmission sensor, and a vibration sensor.

In an embodiment, when the sensor is a camera sensor, the controller may obtain an image by using at least one of a front camera and a rear camera based on a type of the emoticon and transmit the obtained image to a counterpart terminal.

In an embodiment, the controller may display a preview screen with respect to the obtained image together with the received image on the display unit.

In an embodiment, when the sensor is an illumination control sensor, the controller may adjust an intensity of illumination of the display unit to pre-set brightness based on the type of the emoticon.

In an embodiment, when the sensor is a call signal transmission sensor, the controller may transmit a call signal to a counterpart terminal based on the type of the emoticon and display the call signal transmission screen together with the received message on the display unit.

In an embodiment, when the sensor is a vibration sensor, the controller may output a vibration signal for a pre-set period of time based on the type of the emoticon.

To achieve these and other advantages and in accordance with the purpose of this specification, as embodied and broadly described herein, a control method of a mobile terminal includes: receiving a message; displaying the received message on a display unit; when the message displayed on the display unit includes an emoticon, detecting a sensor related to the emoticon; and controlling the detected sensor to perform a function corresponding to the emoticon.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 3 illustrates a flowchart showing an embodiment of the mobile terminal according to an embodiment of the present invention; and FIGS. 4 through 8 illustrate conceptual views showing operation examples of the mobile terminal according to FIG. 3.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
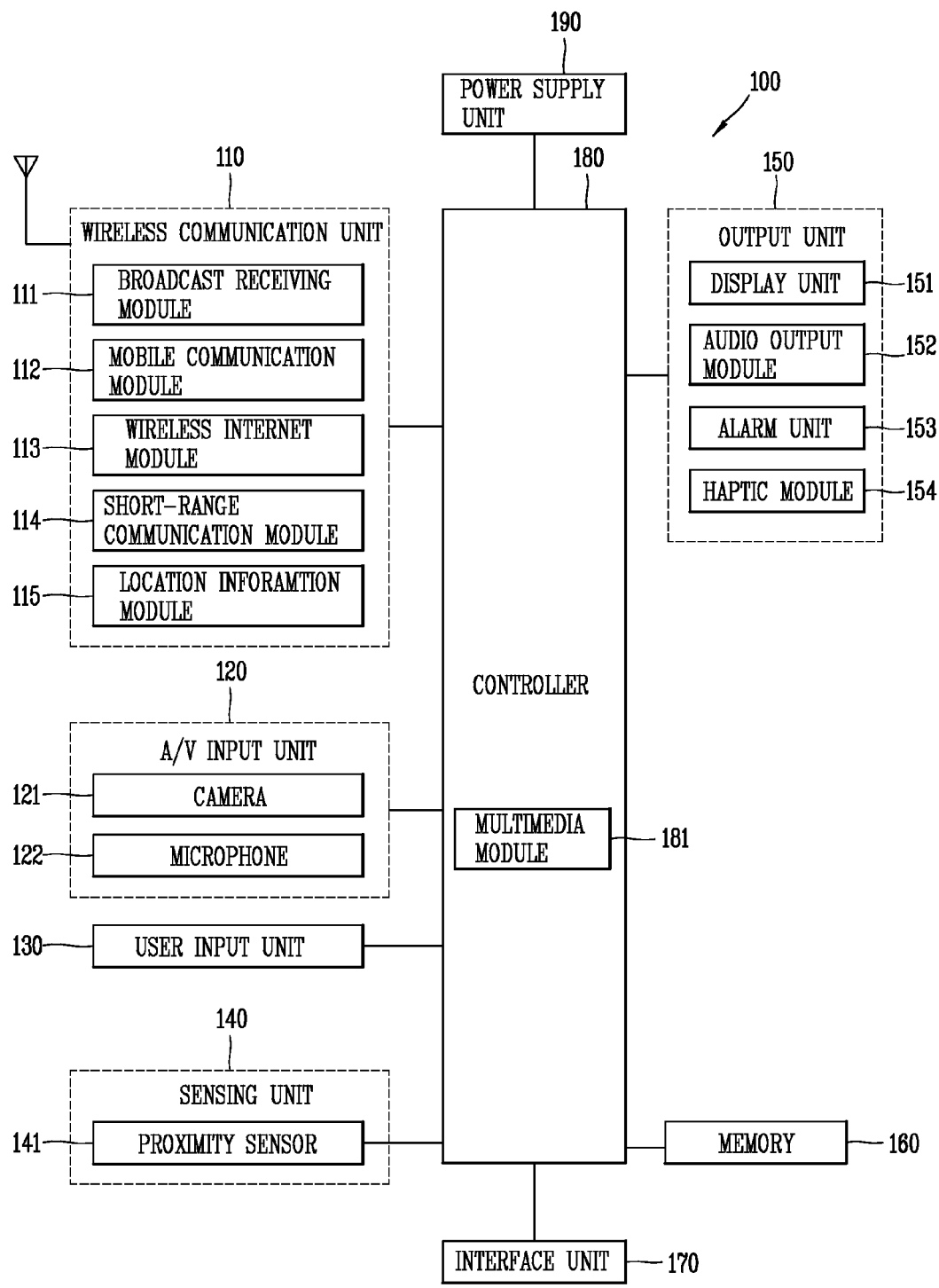
FIG. 1 illustrates a block diagram showing a mobile terminal according to an embodiment of the present invention.

FIG. 1 is a block diagram of a mobile terminal 100 according to an embodiment of the present invention.

As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components 110~190 will be explained.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast associated information may refer to information associated with a broadcast channel, a broadcast program or a broadcast service provider. The broadcast associated information may also be provided via a mobile communication network and, in this case, the broadcast associated information may be received by the mobile communication module 112. Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for acquiring a location (or position) of the mobile communication terminal. For example, the location information module 115 may include a GPS (Global Positioning System) module.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151. The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The sensing unit 140 may include a proximity sensor 141. And, the sensing unit 140 may include a touch sensor (not shown) for sensing a touch operation with respect to the display unit 151.

The touch sensor may be implemented as a touch film, a touch sheet, a touch pad, and the like. The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

If the touch sensor and the display unit 151 have a layered structure therebetween, the display unit 151 may be used as an input device rather than an output device. Such display unit 151 may be called a 'touch screen'.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

When the touch screen is implemented as a capacitance type, proximity of a pointer to the touch screen is sensed by changes of an electromagnetic field. In this case, the touch screen (touch sensor) may be categorized into a proximity sensor 141.

The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on.

In the following description, for the sake of brevity, recognition of the pointer positioned to be close to the touch screen without being contacted will be called a 'proximity touch', while recognition of actual contacting of the pointer on the touch screen will be called a 'contact touch'.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or a capturing mode, the display unit 151 may display a captured and/or received image or a GUI or a UI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The rear surface portion of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of displays may be arranged on one surface integrally or separately, or may be arranged on different surfaces.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. Such video signal or audio signal may be output through the display unit 151 or the audio output module 152. Accordingly, the display unit 151 or the audio output module 152 may be categorized into part of the alarm unit 153.

The haptic module 154 generates various tactile effects the user may feel. A typical example of the tactile effects generated by the haptic module 155 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are inputted or outputted. The memory 160 may store therein data on vibrations and sounds of various patterns output when a touch is input onto the touch screen.

The memory 160 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180. The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Hereinafter, will be explained a method for processing a user's input to the mobile terminal 100.

The user input unit 130 is manipulated to receive a command for controlling the operation of the mobile terminal 100, and may include a plurality of manipulation units. The manipulation units may be referred to as manipulating portions, and may include any type of ones that can be manipulated in a user's tactile manner.

Various types of visible information may be displayed on the display unit 151. Such information may be displayed in several forms, such as character, number, symbol, graphic, icon or the like. Alternatively, such information may be implemented as a 3D stereoscopic image. For input of the information, at least one of characters, numbers, graphics or icons may be arranged and displayed in a preset configuration, thus being implemented in the form of a keypad. Such keypad may be called 'soft key.'

The display unit 151 may be operated as a single entire region or by being divided into a plurality of regions. For the latter, the plurality of regions may cooperate with one another. For example, an output window and an input window may be displayed at upper and lower portions of the display unit 151, respectively. Soft keys representing numbers for inputting telephone numbers or the like may be output on the input window. When a soft key is touched, a number or the like corresponding to the touched soft key is output on the output window. Upon manipulating the manipulation unit, a call connection for a telephone number displayed on the output window is attempted, or a text output on the output window may be input to an application.

In addition to the input manner illustrated in the embodiments, the display unit 151 or the touch pad may be scrolled to receive a touch input. A user may scroll the display unit 151 or the touch pad to move a cursor or pointer positioned on an object (subject), e.g., an icon or the like, displayed on the display unit 151. In addition, in case of moving a finger on the display unit 151 or the touch pad, the path of the finger being moved may be visibly displayed on the display unit 151, which can be useful upon editing an image displayed on the display unit 151.

One function of the mobile terminal may be executed in correspondence with a case where the display unit 151 (touch screen) and the touch pad are touched together within a preset time. An example of being touched together may include clamping a body with the user's thumb and index fingers. The one function, for example, may be activating or deactivating of the display unit 151 or the touch pad.

Figure 2A:
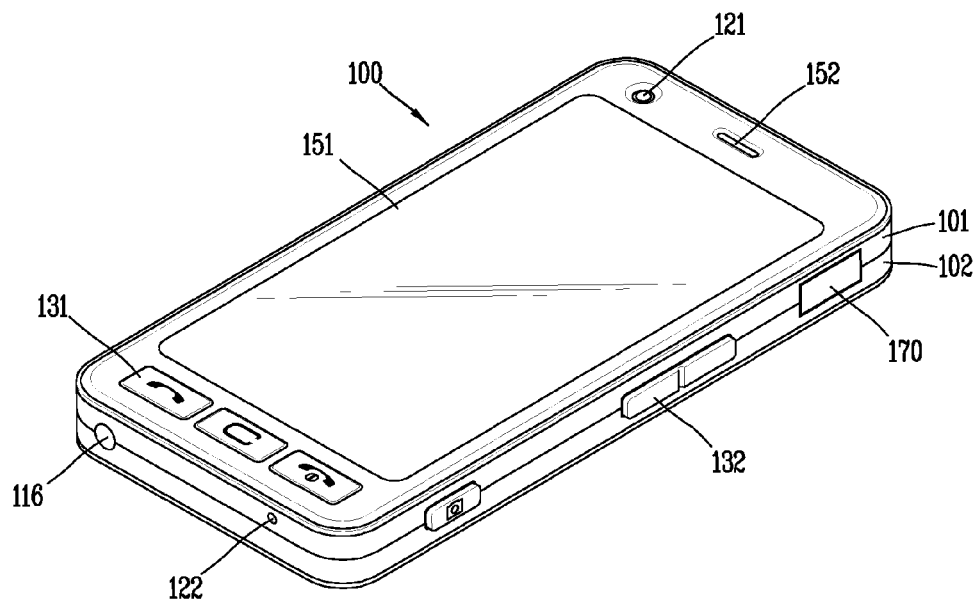
FIGS. 2A and 2B illustrate perspective views showing outer look of the mobile terminal according to an embodiment of the present invention.
Figure 2B:
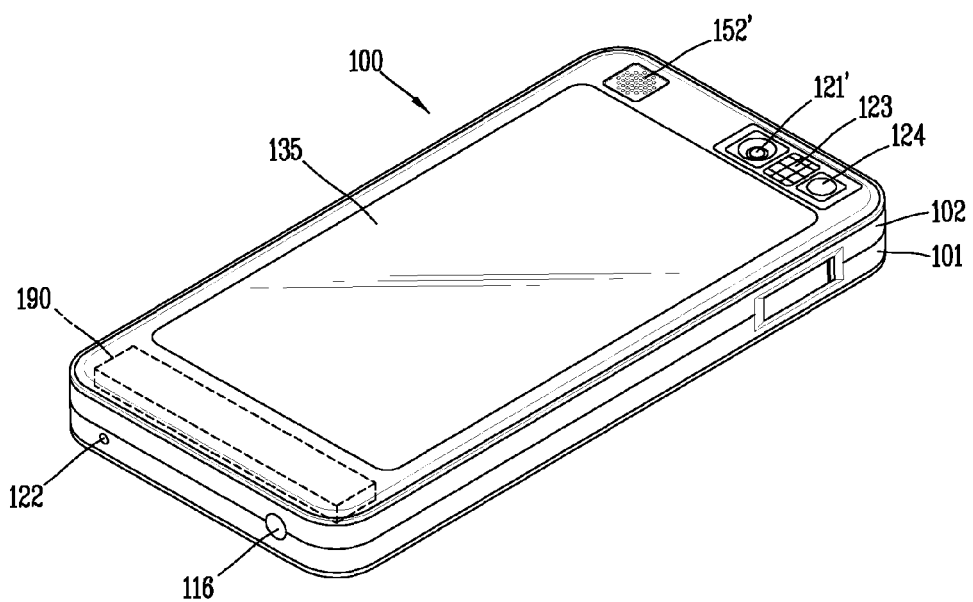

FIGS. 2A and 2B are perspective views showing the appearance of the mobile terminal 100 according to the present invention. FIG. 2A is a view showing a front surface and one side surface of the mobile terminal 100 in accordance with the present invention, and FIG. 2B is a view showing a rear surface and another side surface of the mobile terminal 100 of FIG. 2A.

As shown in FIG. 2A, the mobile terminal 100 is a bar type mobile terminal. However, the present invention is not limited to this, but may be applied to a slide type in which two or more bodies are coupled to each other so as to perform a relative motion, a folder type, or a swing type, a swivel type and the like.

A case (casing, housing, cover, etc.) forming an outer appearance of a body may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display unit 151, an audio output unit 152, a camera 121, a user input unit 130 (refer to FIG. 1), a microphone 122, an interface unit 170, etc.

The display unit 151 occupies most parts of a main surface of the front case 101. The audio output unit 152 and the camera 121 are arranged at a region adjacent to one end of the display unit 151, and the user input unit 131 and the microphone 122 are arranged at a region adjacent to another end of the display unit 151. The user input unit 132, the interface unit 170, etc. may be arranged on side surfaces of the front case 101 and the rear case 102.

The user input unit 130 is manipulated to receive a command for controlling the operation of the mobile terminal 100, and may include a plurality of manipulation units 131 and 132.

The manipulation units 131 and 132 may receive various commands. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display unit 151 to a touch recognition mode.

Referring to FIG. 2B, a camera 121' may be additionally provided on the rear case 102. The camera 121' faces a direction which is opposite to a direction faced by the camera 121 (refer to FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use.

The cameras 121 and 121' may be installed at the terminal body so as to rotate Or pop-up.

A flash 123 and a mirror 124 may be additionally disposed close to the camera 121'. The flash 123 operates in conjunction with the camera 121' when taking a picture using the camera 121'. The mirror 124 can cooperate with the camera 121' to allow a user to photograph himself in a self-portrait mode.

An audio output unit 152' may be additionally arranged on a rear surface of the terminal body. The audio output unit 152' may cooperate with the audio output unit 152 (refer to FIG. 2A) disposed on a front surface of the terminal body so as to implement a stereo function. Also, the audio output unit 152' may be configured to operate as a speakerphone.

A broadcast signal receiving antenna 116 as well as an antenna for calling may be additionally disposed on a side surface of the terminal body. The broadcast signal receiving antenna 116 of the broadcast receiving module 111 (refer to FIG. 1) may be configured to retract into the terminal body.

A power supply unit 190 for supplying power to the mobile terminal 100 is mounted to the body. The power supply unit 190 may be mounted in the body, or may be detachably mounted to the body.

A touch pad 135 for sensing touch may be additionally mounted to the rear case 102. Like the display unit 151 (refer to FIG. 2A), the touch pad 135 may be formed to be light-transmissive. The touch pad 135 may be also additionally mounted with a rear display unit for outputting visual information. Information output from the display unit 151 (front display) and the rear display can be controlled by the touch pad 135.

The touch pad 135 operates in association with the display unit 151. The touch pad 135 may be disposed on the rear surface of the display unit 151 in parallel. The touch pad 135 may have a size equal to or smaller than that of the display unit 151.

Meanwhile, the mobile terminal 100 transmit and receive messages by using a messenger, a short message service (SMS), a multimedia messaging service (MMS), a social network service (SNS), and the like, According to the message transmission and reception function, the mobile terminal 100 may perform one-to-one, one-to-many, and many-to-many communication, and may transmit and receive messages having a splendid multimedia effect dubbed emoticon. However, an emoticon is merely displayed in the form of combinations of special characters, an image, or a flash on a display unit and cannot control a special function of the mobile terminal.

Thus, hereinafter, the mobile terminal 100 capable of enhancing user convenience by using a received emoticon and a control method thereof will be described with reference to the accompanying drawings.

FIG. 3 illustrates a flowchart showing an embodiment of the mobile terminal (100, refer to FIG. 1) according to an embodiment of the present invention. The mobile terminal 100 includes the wireless communication unit (110, refer to FIG. 1), the display unit (151, refer to FIG. 1), and the controller (180, refer to FIG. 1).

Referring to FIG. 3, first, a step (S110) of receiving a message and a step (S120) of displaying the received message on the display unit 151 are performed.

In detail, the wireless communication unit 110 may receive a message. Here, the message may be received through at least one of a messenger, a short message service (SMS), a multimedia messaging service (MMS), and a social network service (SNS).

Next, when the message displayed on the display unit 151 includes an emoticon, a step (S130) of detecting a sensor related to the emoticon is performed.

In detail, the message may include an emoticon. The emoticon may be displayed in the form of a combination of special characters, an image, or a flash. Here, the emoticon includes an emoticon related to a sensor. When the emoticon included in the message is an emoticon related to a sensor, the controller 180 may detect a sensor related to the emoticon.

The sensor may include at least one of a camera sensor, an illumination control sensor, a call signal transmission sensor, and a vibration sensor.

Thereafter, a step (S140) of controlling the detected sensor to perform a function corresponding to the emoticon is performed.

In detail, when the emoticon included in the message is displayed on the display unit 151, the controller 180 may immediately control the sensor to perform a function corresponding to the emoticon. Also, when a touch input applied to the emoticon displayed on the display unit 151 is sensed, the controller 180 may control the sensor to perform a function corresponding to the emoticon.

Although not shown, when the function corresponding to the emoticon is not supported, a message informing that the function is not supported may be displayed together when the emoticon is displayed on the display unit 151.

Also, although not shown, a function corresponding to the emoticon may be performed or a setting or a related sensor may be changed based on a touch input applied to the emoticon. In more detail, when a first touch input applied to the emoticon is sensed, the controller 180 may control an operation of the detected sensor, and when a second touch input applied to the emoticon is sensed, the controller may change a setting of the detected sensor.

As described above, according to an embodiment of the present invention, the mobile terminal 100 may control an operation of the sensor by using the emoticon included in the message. That is, the emoticon may be used for the purpose of controlling hardware, as well as transmitting emotion. Accordingly, the user may transmit a message including an emoticon to a counterpart terminal, to thereby control hardware of the counterpart terminal. As a result, user convenience can be enhanced.

FIG. 4 illustrates a conceptual view showing an operation example of a mobile terminal 200 according to FIG. 3. The mobile terminal 200 includes the wireless communication unit (110, refer to FIG. 1), a display unit 251, and the controller (180, refer to FIG. 1). A camera 221 and audio output module 252 are also shown in the following drawings.

Referring to FIG. 4, the display unit 251 may display a message 253. Here, the displayed message 253 may include an emoticon 254. Here, as illustrated, when the emoticon 254 included in the message 253 is an emoticon related to a vibration sensor, the controller 180 may detect a vibration sensor.

Thereafter, the controller 180 may control the vibration sensor to perform a function corresponding to the emoticon 254, for example, a function of outputting a vibration signal. Accordingly, the controller 180 may output a vibration signal for a pre-set period of time.

Although the operation of immediately outputting a vibration signal when the emoticon 254 included in the message 253 is displayed on the display unit 251 is illustrated in the drawing, the vibration signal may be output only when a touch input applied to the emoticon 254 displayed on the display unit 251 is sensed.

Figure 5:
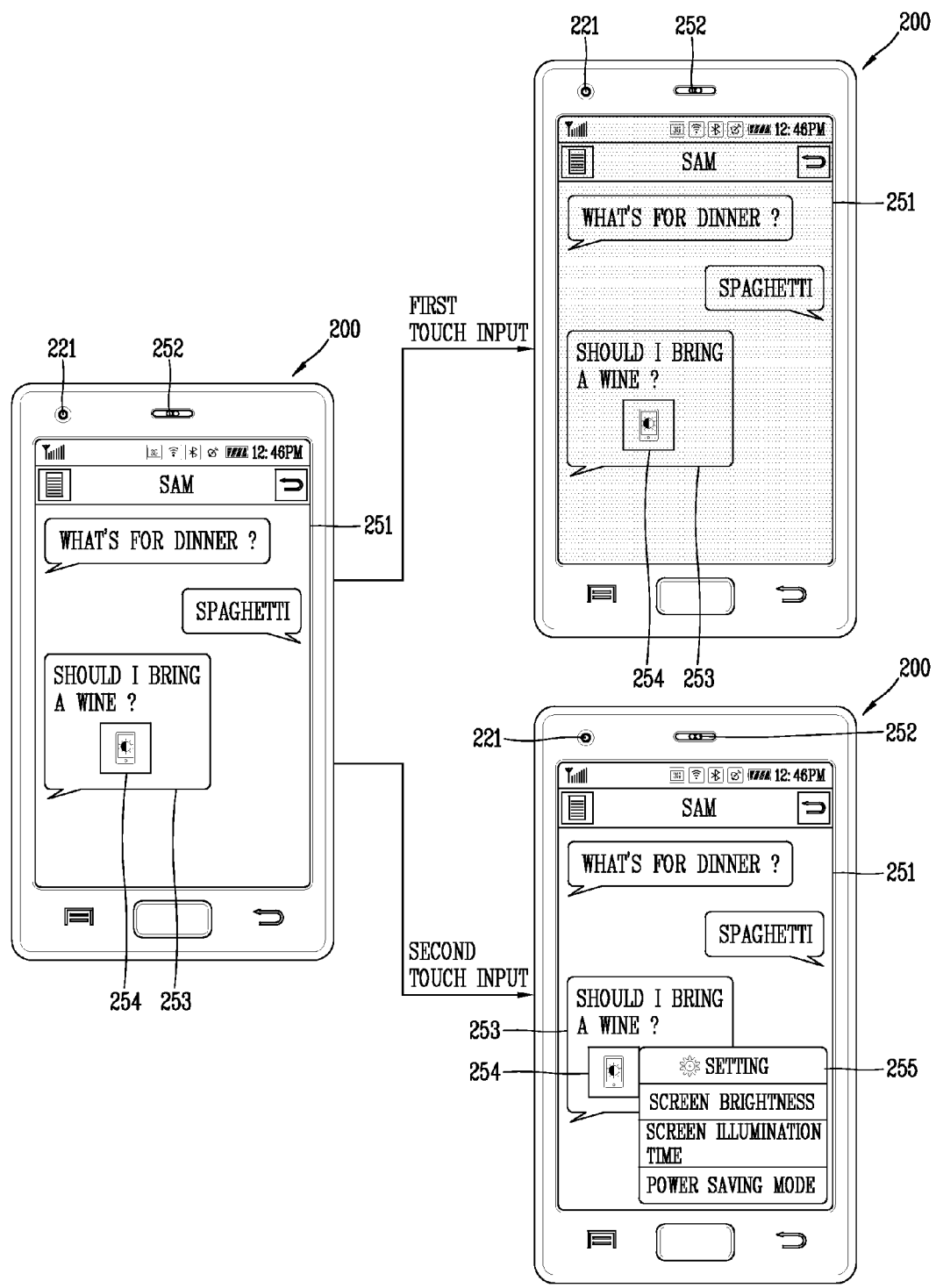

FIG. 5 illustrates a conceptual view showing an operation example of the mobile terminal 200 according to FIG. 3. The mobile terminal 200 includes the wireless communication unit (110, refer to FIG. 1), the display unit 251, and the controller (180, refer to FIG. 1).

Referring to FIG. 5, the display unit 251 may display a message 253. Here, the displayed message 253 may include an emoticon 254. Here, as illustrated, when the emoticon 254 included in the message 253 is an emoticon related to an illumination sensor, the controller 180 may detect an illumination sensor.

Thereafter, when a first touch input applied to the emoticon 254 is sensed, the controller 180 may adjust an intensity of illumination of the display unit 251 to pre-set brightness. For example, the controller 180 may adjust the intensity of illumination such that brightness of the display unit 251 is darker or brighter than a basing setting, and may adjust illumination such that the display unit 251 is repeatedly bright and dark for a pre-set time.

Meanwhile, when a second touch input applied to the emoticon 254 is sensed, the controller 180 may display a menu screen 255 to set illumination information of the display unit 251. Based on a touch input applied to the menu screen 255, a setting of the illumination information may be changed.

Figure 6:
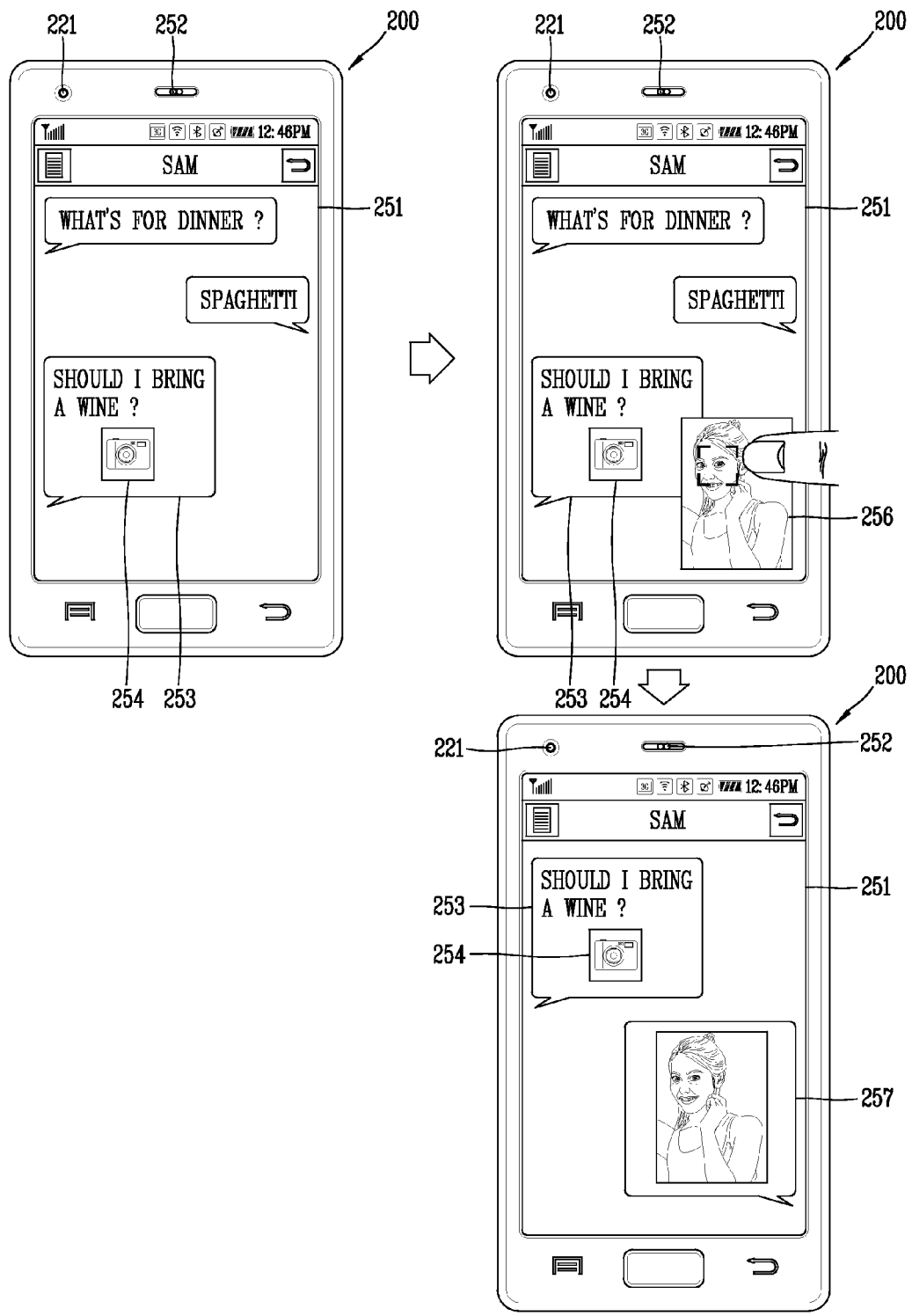

FIG. 6 illustrates a conceptual view showing an operation example of the mobile terminal 200 according to FIG. 3. The mobile terminal 200 includes the wireless communication unit (110, refer to FIG. 1), the display unit 251, and the controller (180, refer to FIG. 1).

the display unit 251 may display a message 253. Here, the displayed message 253 may include an emoticon 254. Here, as illustrated, when the emoticon 254 included in the message 253 is an emoticon related to the camera sensor 221, the controller 180 may detect the camera 221.

Thereafter, the controller 180 may control the camera 221 to perform a function corresponding to the emoticon 254, for example, a function of obtaining an image by using the camera 221. Thus, the controller 180 may obtain an image. Although not shown, an image may be obtained by using any one of the front camera and the rear camera installed in the mobile terminal 200. Also, a video may be obtained based on a type of the emoticon 254.

Also, the controller 180 may display a preview screen 256 regarding the obtained image on the display unit 251. Here, based on a touch input applied to the preview screen 256, the controller 180 may transmit the obtained image to a counterpart terminal. The preview image 256 is then not displayed and the image 257 corresponding to the transmitted image is displayed as a transmitted message transmitted to a counterpart terminal as shown in FIG. 6.

Although the preview screen 256 regarding the obtained image is displayed together with the message 253 on the display unit 251, the message 253 may disappear from the display unit 251 and the preview screen may be displayed as an entire screen.

Also, although not shown, the preview screen may be transmitted to the counterpart terminal. Here, the mobile terminal 200 may receive a control command related to the image obtainment from the counterpart terminal, and an image based on the received control command may be obtained. Thus, the counterpart may control the camera 121 of the mobile terminal 200 of the user.

Figure 7:
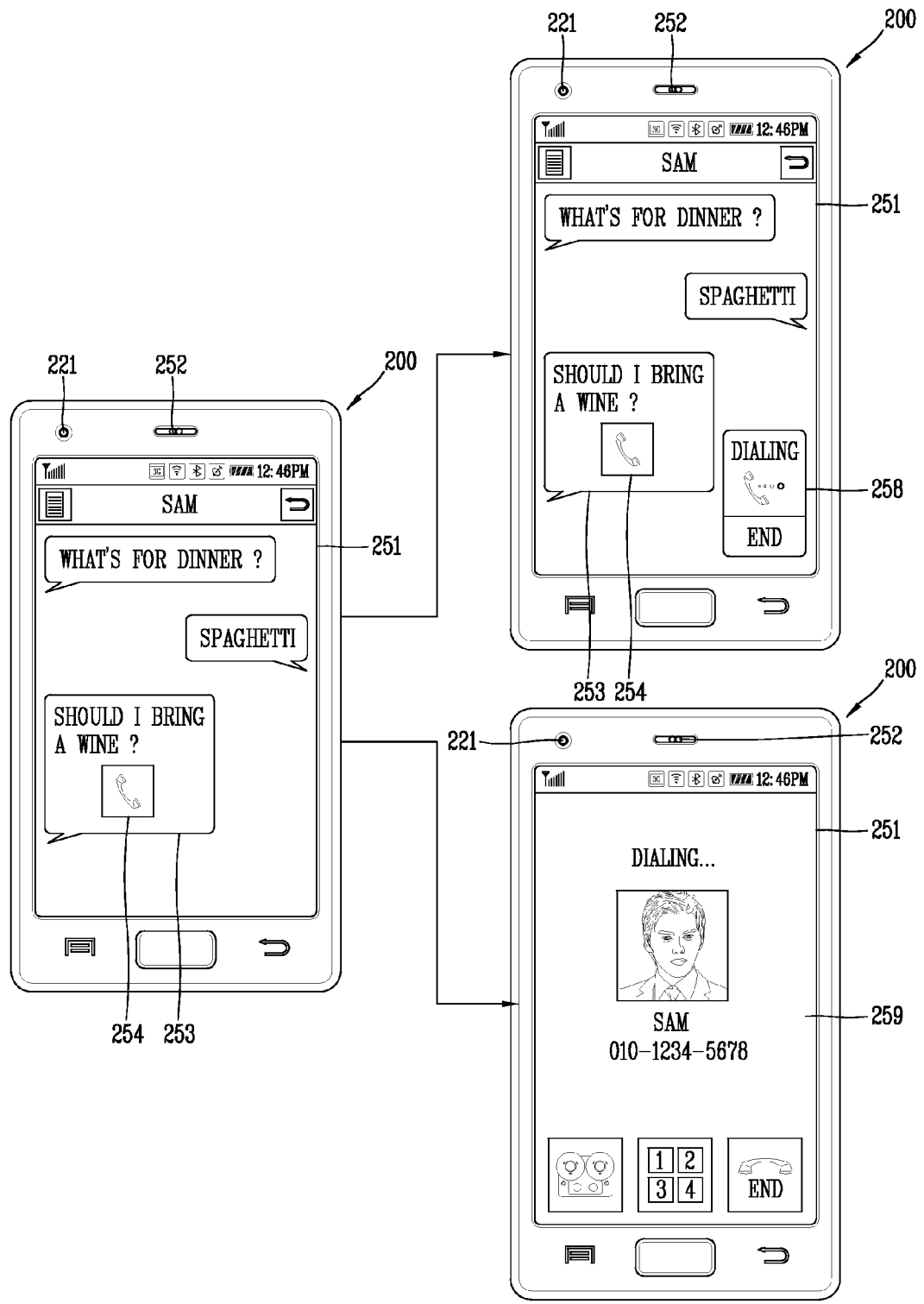

FIG. 7 illustrates a conceptual view showing an operation example of the mobile terminal 200 according to FIG. 3. The mobile terminal 200 includes the wireless communication unit (110, refer to FIG. 1), the display unit 251, and the controller (180, refer to FIG. 1).

Referring to FIG. 7, the display unit 251 may display a message 253. Here, the displayed message 253 may include an emoticon 254. Here, as illustrated, when the emoticon 254 included in the message 253 is an emoticon related to a call signal transmission sensor, the controller 180 may detect a call signal transmission sensor.

Thereafter, the controller 180 may control the call signal transmission sensor to perform a function corresponding to the emoticon 254, for example, a function of transmitting a call signal to a counterpart terminal. Thus, the controller 180 may transmit a call signal to the counterpart terminal.

Here, as illustrated, a call signal transmission screen 258 may be display in a partial region of the display unit 251. Also, the message 253 may disappear from the display unit 251 and the call signal transmission screen 259 may be displayed as an entire screen.

Figure 8:
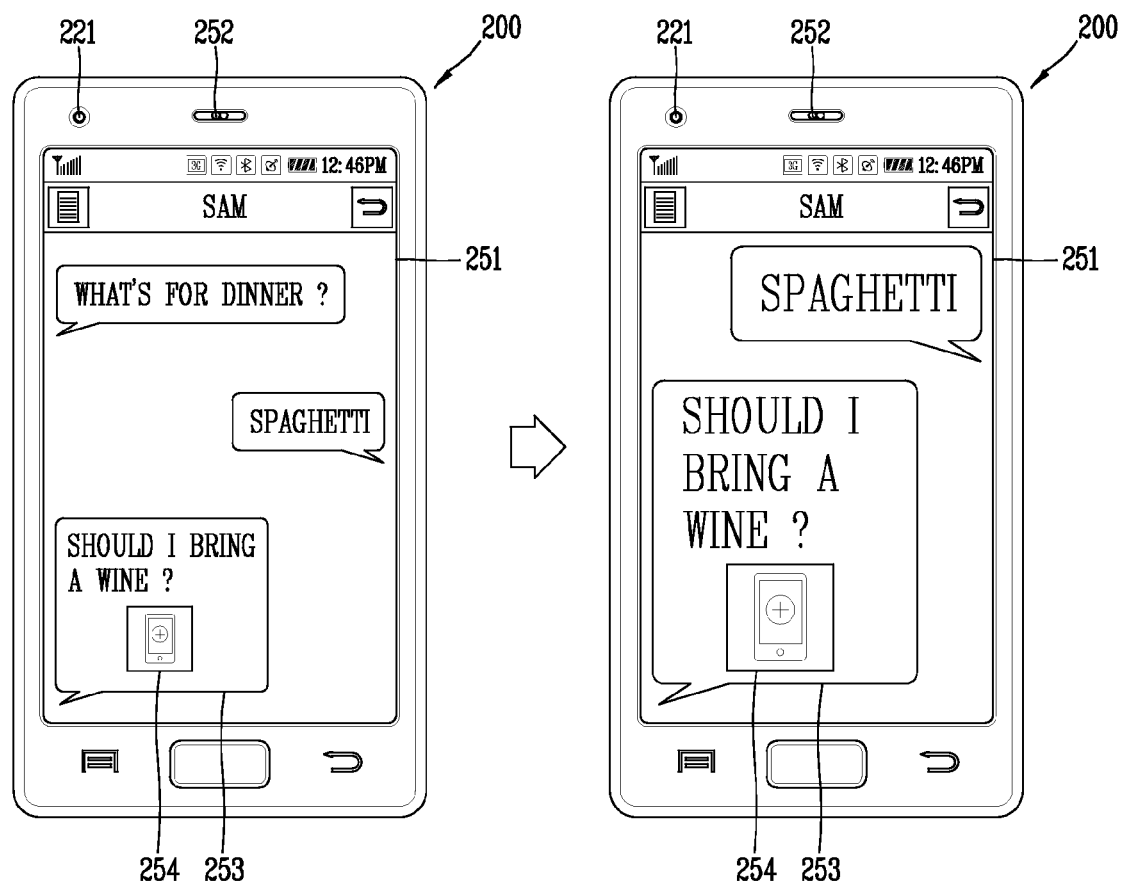

FIG. 8 illustrates a conceptual view showing an operation example of the mobile terminal 200 according to FIG. 3. The mobile terminal 200 includes the wireless communication unit (110, refer to FIG. 1), the display unit 251, and the controller (180, refer to FIG. 1).

Referring to FIG. 8, the display unit 251 may display a message 253. Here, the displayed message 253 may include an emoticon 254. Here, as illustrated, when the emoticon 254 included in the message 253 is an emoticon related to a message upsizing sensor, the controller 180 may upsize the message displayed on the display unit 251 to a pre-set size for a pre-set period of time.

Although not shown, when the controller 180 receives an emoticon related to a message downsizing sensor, the controller 180 may downsize the message displayed on the display unit 251.

Also, although not shown, when an emoticon related to a background image changing sensor is received, the controller 180 may change a background screen or a background image of a message conversation screen. Here, the controller 180 may use an image received from the counterpart terminal. To this end, the received emoticon may include a thumbnail image.

In the embodiments of the present invention, the foregoing method may be implemented as codes that can be read by a processor in a program-recorded medium. The processor-readable medium may include any types of recording devices in which data that can be read by a computer system is stored. The computer-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet).

The mobile terminal according to the embodiments of the present disclosure is not limited in its application of the configurations and methods, but the entirety or a portion of the embodiments can be selectively combined to be configured into various modifications.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a wireless communication unit configured to receive a message including a camera emoticon from a counterpart terminal;
    a display unit configured to display the received message with the camera emoticon in a message window; and
    a controller configured to:
        in response to detection of the camera emoticon received with the message, operate a camera on the mobile terminal and display a preview image from the operated camera together with the received message in the message window, and
        in response to a user input, capture an image corresponding to the preview image, transmit the captured image to the counterpart terminal, and display the transmitted image in the message window.

2. The mobile terminal of claim 1, wherein the controller is further configured to:
    receive a second touch input with respect to the camera emoticon displayed on the display unit, and
    change a setting of the detected camera.

3. The mobile terminal of claim 1, wherein, the controller is further configured to obtain the image by using at least one of a front camera and a rear camera based on a type of the camera emoticon.

4. The mobile terminal of claim 1, wherein the controller is further configured to stop displaying the preview image and display the transmitted image on the display unit as a transmitted message transmitted to the counterpart terminal.

5. A method of controlling a mobile terminal, the method comprising:
    receiving, via a wireless communication unit of the mobile terminal, a message including a camera emoticon from a counterpart terminal;
    displaying the received message with the camera emoticon in a message window;
    in response to detection of the camera emoticon received with the message, operating a camera on the mobile terminal and displaying a preview image from the operated camera together with the received message in the message window; and
    in response to a user input, capturing an image corresponding to the preview image, transmitting the captured image to the counterpart terminal, and displaying the transmitted image in the message window.

6. The method of claim 5, further comprising:
    receiving a second touch input with respect to the camera emoticon displayed on the display unit; and
    changing a setting of the detected camera.

7. The method of claim 5, further comprising obtaining the image by using at least one of a front camera and a rear camera based on a type of the emoticon.

8. The method of claim 5, further comprising:
    stop displaying the preview image and displaying the transmitted image on the display unit as a transmitted message transmitted to the counterpart terminal.

* * * * *